(12) United States Patent
Davis

(10) Patent No.: US 7,076,412 B1
(45) Date of Patent: Jul. 11, 2006

(54) METHOD AND APPARATUS FOR STORING AND SELECTIVELY RETRIEVING DIMENSIONS OF GEOMETRY PIECES OF A MECHANICAL DESIGN

(75) Inventor: Kenneth Davis, San Diego, CA (US)

(73) Assignee: Autodesk, Inc., Sausalito, CA (US)

( * ) Notice: Subject to any disclaimer, the term of this patent is extended or adjusted under 35 U.S.C. 154(b) by 0 days.

(21) Appl. No.: 09/569,542

(22) Filed: May 12, 2000

(51) Int. Cl.
*G06G 7/48* (2006.01)
*G06F 15/00* (2006.01)
*G06F 17/00* (2006.01)
*G06F 17/21* (2006.01)
*G06F 17/24* (2006.01)

(52) U.S. Cl. .......................................... 703/7; 715/502
(58) Field of Classification Search .................... 703/7; 715/502
See application file for complete search history.

(56) References Cited

U.S. PATENT DOCUMENTS

| | | | | |
|---|---|---|---|---|
| 5,337,404 A | * | 8/1994 | Baudelaire et al. | 345/441 |
| 5,437,008 A | * | 7/1995 | Gay et al. | 715/502 |
| 5,548,707 A | * | 8/1996 | LoNegro et al. | 715/502 |
| 5,577,189 A | * | 11/1996 | Gay et al. | 715/800 |
| 5,655,095 A | | 8/1997 | LoNegro et al. | |
| 5,729,750 A | * | 3/1998 | Ishida | 715/502 |
| 5,999,186 A | * | 12/1999 | Jackson | 345/420 |
| 6,281,907 B1 | * | 8/2001 | Baumann | 345/660 |

* cited by examiner

*Primary Examiner*—Paul L. Rodriguez
*Assistant Examiner*—Dwin M. Craig
(74) *Attorney, Agent, or Firm*—Fish & Richardson P.C.

(57) ABSTRACT

The present invention includes computer instructions that facilitate characterizing a geometry piece based upon one or more received input selections, generating a temporary dimension type based, at least in part, upon the characterization, storing the temporary dimension type, and displaying the temporary dimension type. In one embodiment, the computer instructions are part of a mechanical design software application. In one embodiment, the mechanical software application including the computer instructions are embodied in a distribution storage medium.

24 Claims, 11 Drawing Sheets

METHOD AND APPARATUS FOR STORING AND SELECTIVELY RETRIEVING DIMENSIONS OF GEOMETRY PIECES OF A MECHANICAL DESIGN

FIELD OF INVENTION

The present invention relates to the field of computer aided design (CAD). More specifically, the present invention relates to computer assistance to a designer working with dimensions of geometry of a mechanical design.

BACKGROUND OF THE INVENTION

In order to define geometry pieces of mechanical designs, the geometry pieces have to be dimensioned. An example of a dimension is a linear dimension from one edge of a geometry piece to a hole in the same geometry piece. Along with the linear dimension, a radius dimension may define the size of the hole. Together, the linear dimension and the radius dimension define a location and size of the hole in the geometry piece of the mechanical design. Full definition of the geometry piece normally includes multiple dimensions with varying features. Examples of types of dimensions are horizontal, vertical, parallel, perpendicular, diameter, radius, etc. For the purposes of this application, vertical, horizontal, etc., will be generically referred to as dimension types. Additionally, for the purposes of this application, lines, arcs, etc., will be generically referred to as geometry pieces.

Generally, only limited support is provided by conventional design software on dimensioning multiple geometry pieces and selecting a type of dimension a designer wishes to display. Typically, the support is limited to a method involving selecting a first piece of geometry, selecting a second piece of geometry, and creating a temporary dimension between the two pieces of geometry. The temporary dimension type will depend on the nature of the two pieces of geometry. Once the designer has viewed the temporary dimension type, the designer will typically have to re-select the geometry pieces in order to display a desired dimension. Thus, displaying a type of dimension that is not the last temporary dimension will require the designer to redundantly re-select the previously selected geometry pieces in the same sequence. However, recreating the desired dimension can be difficult because recreating the previous temporary dimension type will often require the designer to select the identical position on the geometry pieces, which can be difficult.

Thus, a more user friendly approach for selecting a dimension for display, while displaying several temporary dimension types is desired. As will be discussed in more detail below, the present invention achieves these and other desirable objectives, which will be apparent from the disclosure to follow.

SUMMARY OF THE INVENTION

The present invention includes computer instructions that facilitate characterizing a geometry piece based upon one or more received input selections, generating a temporary dimension type based, at least in part, upon the characterization, storing the temporary dimension type, and displaying the temporary dimension type. In one embodiment, the computer instructions are part of a mechanical design software application. In one embodiment, the mechanical software application including the computer instructions are embodied in a distribution storage medium.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Figure 1:
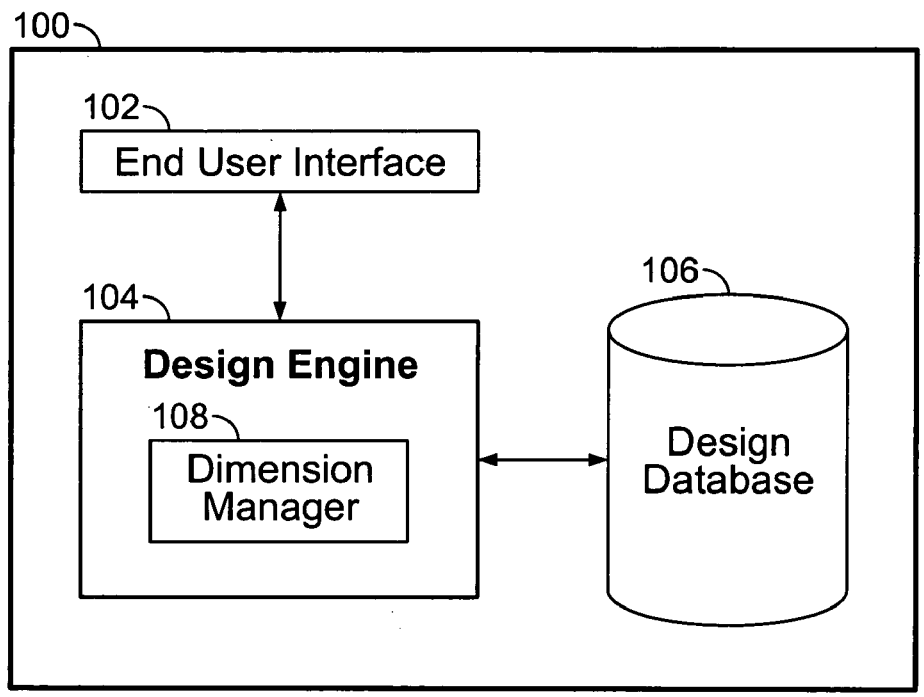
FIG. 1 illustrates one embodiment of a mechanical design application incorporated with the teachings of the present invention.

Referring now to FIG. 1, wherein a block diagram illustrating one embodiment of a mechanical design application is shown. As illustrated, mechanical design application 100 includes end user interface 102, design engine 104, and design database 106. Design engine 104 includes in particular dimension manager 108 incorporated with the teachings of the present invention. Together, the elements cooperate to facilitate dimensioning of geometry pieces of mechanical designs by a designer. More specifically, end user interface 102 operates to facilitate graphical displays and input of dimensions of mechanical designs for the designer, under the control of design engine 104. Design database 106 facilitates storage of mechanical designs and dimensions created by the designer, also under the control of design engine 104. In particular, dimension manager 108 generates and stores temporary dimensions and facilitates displaying selected stored temporary dimensions. Except for the teachings of the present invention incorporated in design manager 108, mechanical design application 100 is intended to represent a broad range of computer aided design (CAD) drawing software known in the art, including but not limited to Mechanical Desktop®, available from Autodesk, Inc. of San Rafael, Calif.

FIGS. 2a–2e illustrate generating and storing a number of temporary dimension types between a number of geometry pieces of a mechanical design based upon a characterization of the number of geometry pieces.

Figure 2A:
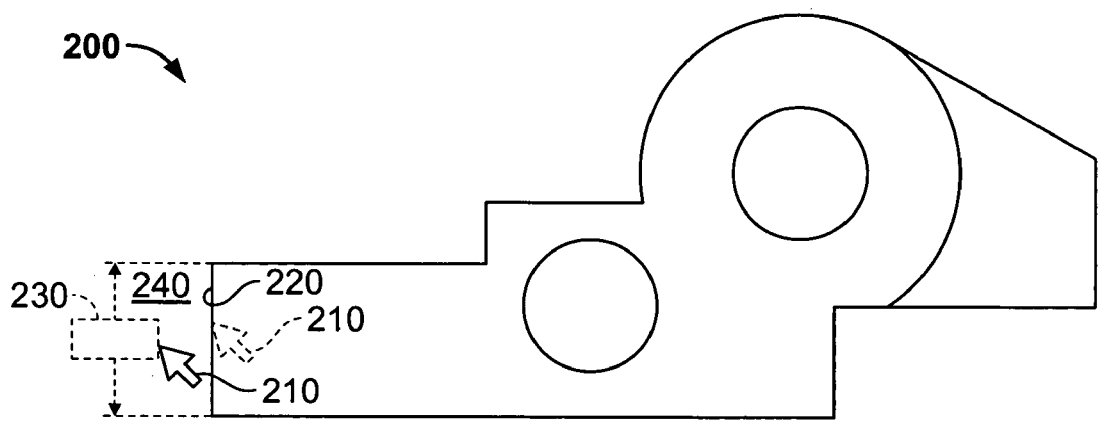
FIGS. 2a–2e illustrate generating and storing a number of temporary dimension types between a number of geometry pieces of a mechanical design based upon a characterization of the number of geometry pieces.

FIG. 2a illustrates generating and storing a first temporary dimension type in response to a user selecting a first geometry piece. As illustrated in FIG. 2a, in response to the user selecting the first geometry piece 220 with a cursor 210, the first geometry piece 220 is characterized as a line, and therefore, a linear temporary dimension type 230 is generated. As shown in FIG. 2a, the linear temporary dimension type 230 defines a length of the first geometry piece 220. Once the linear temporary dimension type 230 is generated, the linear temporary dimension type 230 is automatically stored in a design database 106 as the first temporary dimension type. Additionally, the linear temporary dimension type 230 is displayed in an area 240 around the mechanical design 200 in response to a location of the cursor 210.

Figure 2B:
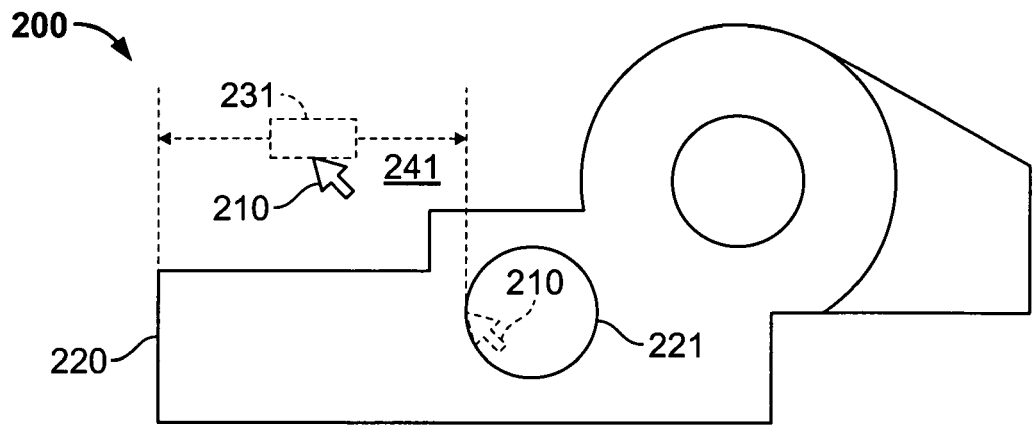

FIG. 2b illustrates generating and storing a second temporary dimension type in response to the user selecting a second geometry piece. As illustrated in FIG. 2b, in response to the user selecting the second geometry piece 221 with the cursor 210, the second geometry piece 221 is characterized as an arc, and therefore, a tangent temporary dimension type 231 is generated between the first geometry piece 220 and the second geometry piece 221. It should be appreciated by those skilled in the art that the geometry piece characterized as the arc may also be characterized as a circle, where the circle characterization may be applied when referring to a center point. Thus it should be appreciated by those skilled in the art that the arc and circle characterization may be interchangeable. As shown in FIG. 2b, the tangent temporary dimension type 231 defines a distance between the first geometry piece 220 and the second geometry piece 221. Once the tangent temporary dimension type 231 is generated, the tangent temporary dimension type 231 is automatically stored in the design database 106 as the second temporary dimension type. Similar to FIG. 2a, the tangent temporary dimension type 231 is displayed in an area 241 around the mechanical design 200 in response to a location of the cursor 210.

Figure 2C:
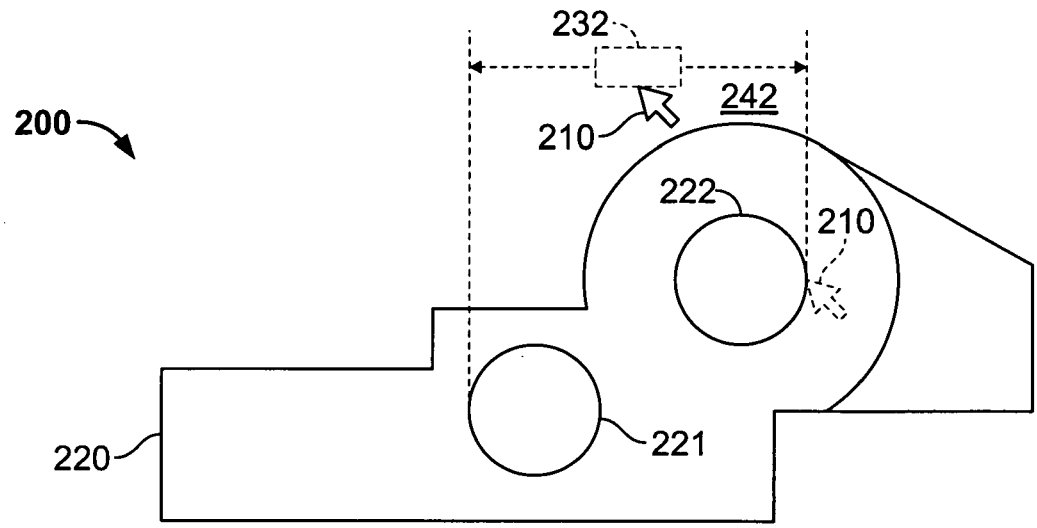

FIG. 2c illustrates generating and storing a third temporary dimension type in response to the user selecting a third geometry piece. As illustrated in FIG. 2c, in response to the user selecting the third geometry piece 222 with the cursor 210, the third geometry piece 222 is characterized as an arc. Since the second geometry piece 221 (last geometry piece to have been selected) is characterized as an arc and the third geometry piece 222 is also characterized as an arc, a tangent to tangent temporary dimension type 232 is generated between the second geometry piece 221 and the third geometry piece 222. As shown in FIG. 2c, the tangent to tangent temporary dimension type 232 generated defines a distance between the second geometry piece 221 and the third geometry piece 222. Once the tangent to tangent temporary dimension type 232 is generated, the tangent to tangent temporary dimension type 232 is automatically stored in the design database 106 as the third temporary dimension type. Similar to FIGS. 2a and 2b, the tangent to tangent temporary dimension type 232 is displayed in an area 242 around the mechanical design 200 in response to a location of the cursor 210.

Figure 2D:
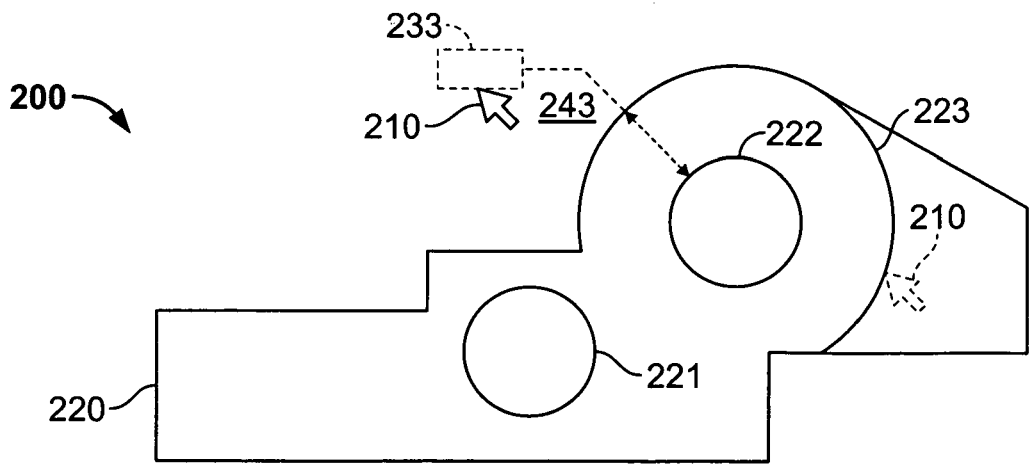

FIG. 2d illustrates generating and storing a fourth temporary dimension type in response to the user selecting a fourth geometry piece. As illustrated in FIG. 2d, in response to the user selecting the fourth geometry piece 223 with the cursor 210, the fourth geometry piece 222 is characterized as an arc. Since the third geometry piece 222 (last geometry piece to have been selected) is characterized as an arc and the fourth geometry piece 223 is also characterized as an arc with the third geometry piece 222 located within the fourth geometry piece 223, a concentric temporary dimension type 233 is generated between the third geometry piece 222 and the fourth geometry piece 223. As shown in FIG. 2d, the concentric temporary dimension type 233 generated defines a difference in radii between the third geometry piece 222 and the fourth geometry piece 223. Once the concentric temporary dimension type 233 is generated, the concentric temporary dimension type 233 is generated is automatically stored in the design database 106 as the fourth temporary dimension type. Similar to FIGS. 2a–2c, the concentric temporary dimension type 233 is displayed in an area 243 around the mechanical design 200 in response to a location of the cursor 210.

Figure 2E:
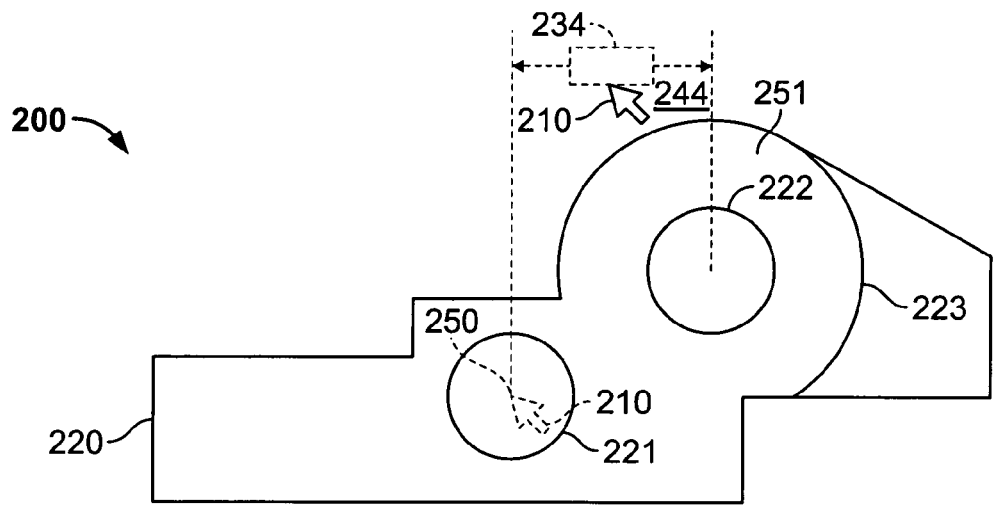

FIG. 2e illustrates generating and storing a fifth temporary dimension type in response to the user selecting a fifth geometry piece, an alternate position on the second geometry piece. As illustrated in FIG. 2e, in response to the user selecting the fifth geometry piece 250, the alternate position on the second geometry piece 221, with the cursor 210, the fifth geometry piece 250 is characterized as a circle center. Since the fifth geometry piece 250 is characterized as a circle center and the fourth geometry piece 223 (last geometry piece to have been selected) is characterized as an arc, an inferred circle center 251 of the fourth geometry piece 223 is automatically generated for generating the fifth temporary dimension type. As shown in FIG. 2e, a linear temporary dimension type 234 between the fifth geometry piece 250 and the inferred circle center 251 of the fourth geometry piece 223 is generated defining a distance between the fifth geometry piece 250 and the inferred circle center 251 of the fourth geometry piece 223. The linear temporary dimension type 234 between the fifth geometry piece 250 and the inferred circle center 251 of the fourth geometry piece 223 is automatically stored in the design database 106 as the fifth temporary dimension type. Similar to FIGS. 2a–2d, the linear temporary dimension type 234 is displayed in an area 244 around the mechanical design 200 in response to a location of the cursor 210.

FIGS. 3a–3e illustrate an alternate embodiment of the present invention for generating and storing a number of user defined temporary dimension types between a number of geometry pieces of a mechanical design based upon a user defined characterization of the number of geometry pieces where the user defined function is enabled.

Figure 3A:
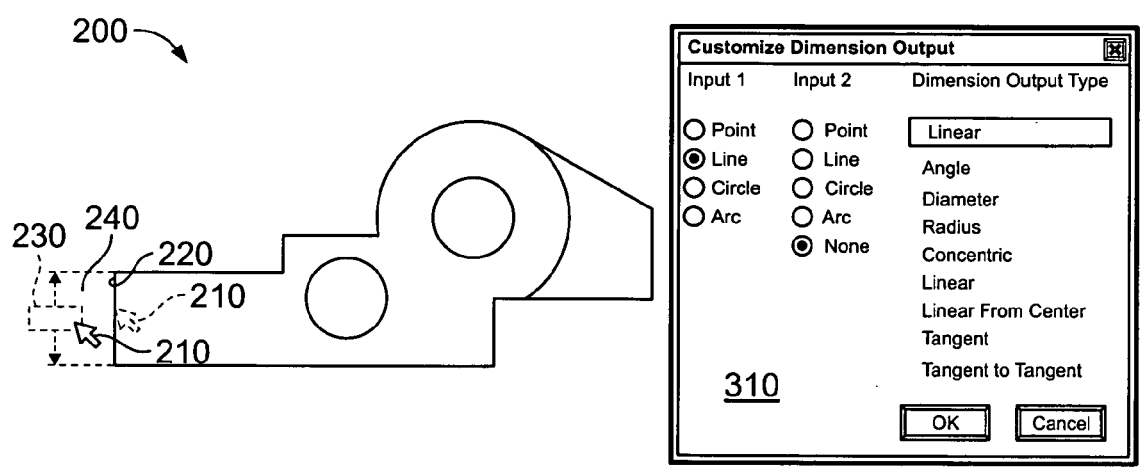
FIGS. 3a–3e illustrate an alternate embodiment of the present invention for generating and storing a number of user defined temporary dimension types between a number of geometry pieces of a mechanical design based upon a user defined characterization of the number of geometry pieces where the user defined function is enabled.

FIG. 3a illustrates generating and storing a first user defined temporary dimension type in response to a user selecting a first geometry piece and setting a first customize dimension output menu. As illustrated in FIG. 3a, a user defined linear temporary dimension type 230 is generated in response to the user selecting the first geometry piece 220 with cursor 210 and setting the first customize dimension output menu 310. In FIG. 3a, an input 1 is displayed as characterizing the first geometry piece 220 as a line and an input 2 is displayed as not characterizing a geometry piece in the first custom dimension output menu 310. Additionally, in FIG. 3a, a dimension output type is displayed as linear in the first customize dimension output menu 310 set by the user. In response to the setting of the first customize dimension output menu 310 as shown, the user defined linear temporary dimension type 230 is generated and automatically stored in the design database 106 as the first user defined temporary dimension type. As shown in FIG. 3a, the user defined linear temporary dimension type defines a length of the first geometry piece 220 in accordance with the setting of the first customize dimension output menu 310. Similar to FIG. 2a, the user defined linear temporary dimension type 230 is displayed in the area 240 around the mechanical design 200 in response to the location of the cursor 210.

Figure 3B:
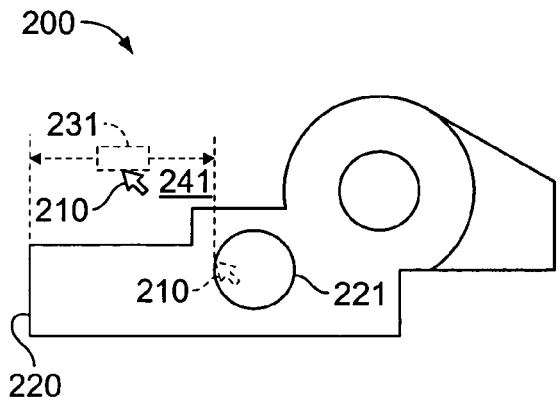
Figure 3B:
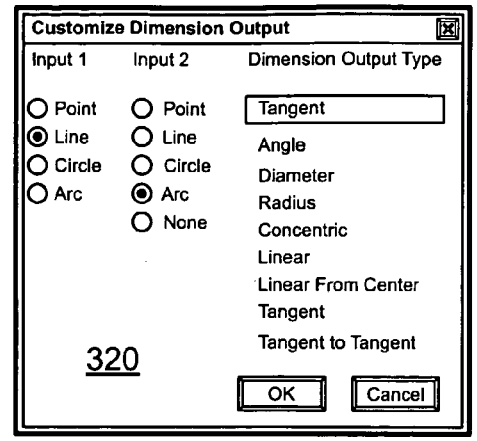

FIG. 3b illustrates generating and storing a second user defined temporary dimension type in response to the user selecting a second geometry piece and setting a second customize dimension output menu. As illustrated in FIG. 3b, a user defined tangent temporary dimension type 231 is generated in response to the user selecting the second geometry piece 221 and setting the second customize dimension output menu 320. In FIG. 3b, an input 1 is displayed as characterizing the first geometry piece 220 (last geometry piece to have been selected) as a line and an input 2 is displayed characterizing the second geometry piece 221 as an arc in the second customize dimension output menu 320. Additionally, in FIG. 3b, a dimension output type is displayed as tangent in the second customize dimension output menu 320 set by the user. In response to the setting of the second customize dimension output menu 320 as shown, the user defined tangent temporary dimension type 231 is generated and automatically stored in the design database 106 as the second user defined temporary dimension type. As shown in FIG. 3b, the user defined tangent temporary dimension type 231 defines a distance between the first geometry piece 220 and the second geometry piece 221 in accordance with the settings of the second customize dimension output menu 320. Similar to FIG. 2b, the user defined tangent temporary dimension type 231 is displayed in the area 241 around the mechanical design 200 in response to the location of the cursor 210.

Figure 3C:
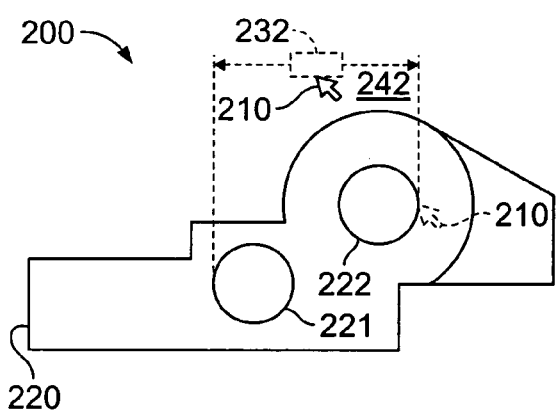
Figure 3C:
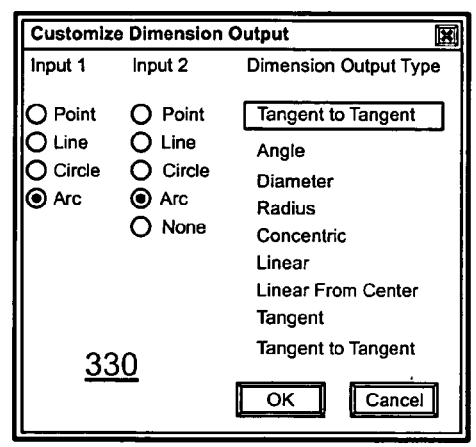

FIG. 3c illustrates generating and storing a third user defined temporary dimension type in response to the user selecting a third geometry piece and setting a third customize dimension output menu. As illustrated in FIG. 3c, a user defined tangent to tangent temporary dimension type 232 is generated in response to the user selecting the third geometry piece 222 and setting the third customize dimension output menu 330. In FIG. 3c, an input 1 is displayed as characterizing the second geometry piece 221 (last geometry piece to have been selected) as an arc and an input 2 is displayed characterizing the third geometry piece 222 as an arc in the third customize dimension output menu 330. Additionally, in FIG. 3c, a dimension output type is displayed as tangent to tangent in the third customize dimension output menu 330 set by the user. In response to the setting of the third customize dimension output menu 330 as shown, the user defined tangent to tangent temporary dimension type 232 is generated and automatically stored in the design database 106 as the third user defined temporary dimension type. As shown in FIG. 3c, the user defined tangent to tangent temporary dimension type 232 defines a distance between the second geometry piece 221 and the third geometry piece 222 in accordance with the settings of the third customize dimension output menu 330. Similar to FIG. 2c, the user defined tangent to tangent temporary dimension type 232 is displayed in the area 242 around the mechanical design 200 in response to the location of the cursor 210.

Figure 3D:
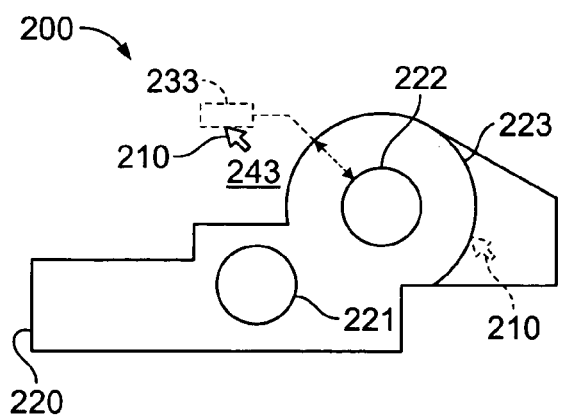
Figure 3D:
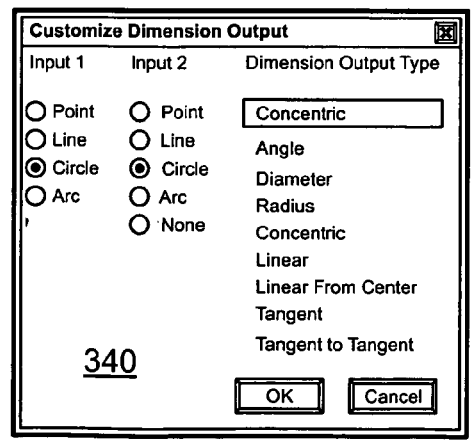

FIG. 3d illustrates generating and storing a fourth user defined temporary dimension type in response to the user selecting a fourth geometry piece and setting a fourth customize dimension output menu. As illustrated in FIG. 3d, a user defined concentric temporary dimension type 233 is generated in response to the user selecting the fourth geometry piece 223 and setting the fourth customize dimension output menu 340. In FIG. 3d, an input 1 is displayed as characterizing the third geometry piece 222 (last geometry piece to have been selected) as a circle and an input 2 is displayed characterizing the fourth geometry piece 223 as a circle in the fourth customize dimension output menu 340. Additionally, in FIG. 3d, a dimension output type is displayed as concentric in the fourth customize dimension output menu 340 set by the user. In response to the setting of the fourth customize dimension output menu 340 as shown, the user defined concentric temporary dimension type 233 is generated and automatically stored in the design database 106 as the fourth user defined temporary dimension type. As shown in FIG. 3d, the user defined concentric temporary dimension type 233 defines a difference in radii between the third geometry piece 222 and the fourth geometry piece 223 in accordance with the settings of the fourth customize dimension output menu 340. Similar to FIG. 2d, the user defined concentric temporary dimension type 233 is displayed in the area 243 around the mechanical design 200 in response to the location of the cursor 210.

Figure 3E:
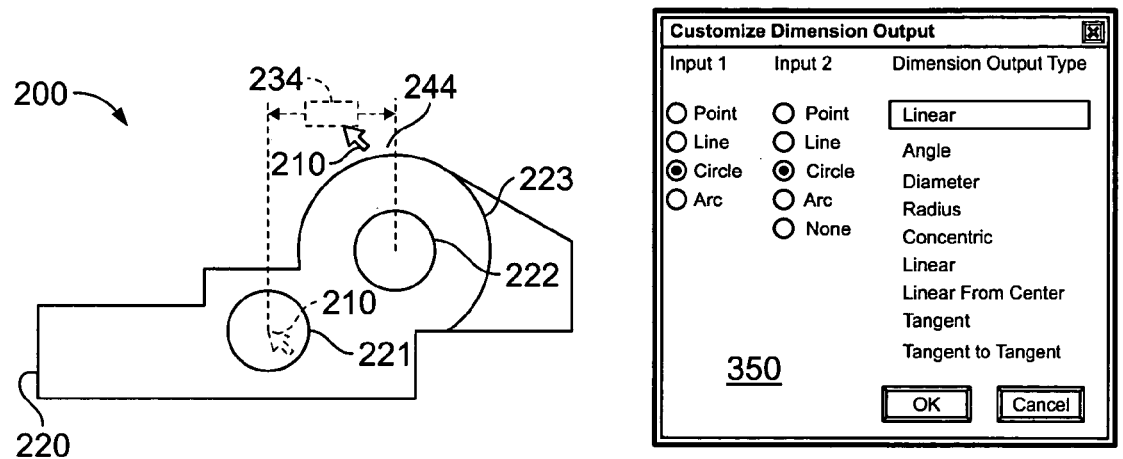

FIG. 3e illustrates generating and storing a fifth user defined temporary dimension type in response to the user selecting a fifth geometry piece and setting a fifth customize dimension output menu. As illustrated in FIG. 3e, a user defined linear temporary dimension type 234 is generated in response to the user selecting the fifth geometry piece 224 and setting the fifth customize dimension output menu 350. In FIG. 3e, an input 1 is displayed as characterizing the fourth geometry piece 223 (last geometry piece to have been selected) as a circle and an input 2 is displayed characterizing the fifth geometry piece 224 as a circle in the fifth customize dimension output menu 350. Additionally, in FIG. 3e, a dimension output type is displayed as linear in the fifth customize dimension output menu 350 set by the user. In response to the setting of the fifth customize dimension output menu 350 as shown, the user defined linear temporary dimension type 234 is generated and automatically stored in the design database 106 as the fifth user defined temporary dimension type. As shown in FIG. 3e, since the user defined linear temporary dimension type 234 is selected between two circles, the user defined linear temporary dimension type 234 defines a distance between a center of the fourth geometry piece 223 and a center of a fifth geometry piece 224 in accordance with the settings of the fifth customize dimension output menu 350. Similar to FIG. 2e, the user defined concentric temporary dimension type 234 is displayed in the area 244 around the mechanical design 200 in response to the location of the cursor 210.

FIGS. 4a–4e illustrate displaying several stored temporary dimension types. As previously shown in FIGS. 2a–2e and FIGS. 3a–3e, the five temporary dimension types were generated and stored in the design database 106. Once the desired number of temporary dimension types have been stored, the present invention facilitates the displaying of the stored temporary dimension types.

Figure 4A:
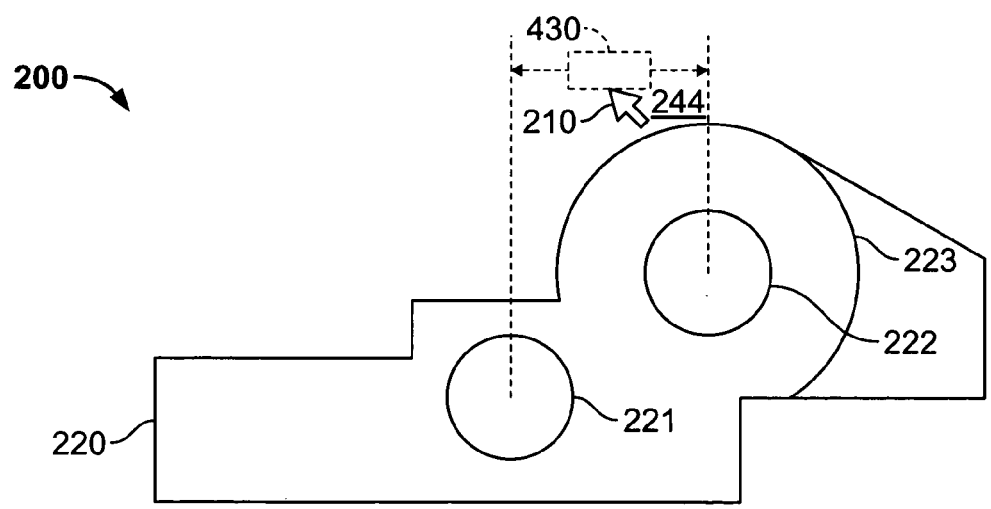
FIGS. 4a–4e illustrate displaying several stored temporary dimension types.

FIG. 4a illustrates displaying of a first stored temporary dimension type in response to a first pressing of a BACKSPACE key on a keyboard (not shown). As illustrated in FIG. 4a, the first stored temporary dimension type 430 is displayed in response to the first pressing of the BACKSPACE key on the keyboard. The first stored temporary dimension type 430 displayed may be the linear temporary dimension type 234 (shown in FIGS. 2e and 3e). Similar to FIGS. 2e and 3e, the user first stored temporary dimension type 430 is displayed in the area 244 around the mechanical design 200 in response to the location of the cursor 210.

Figure 4B:
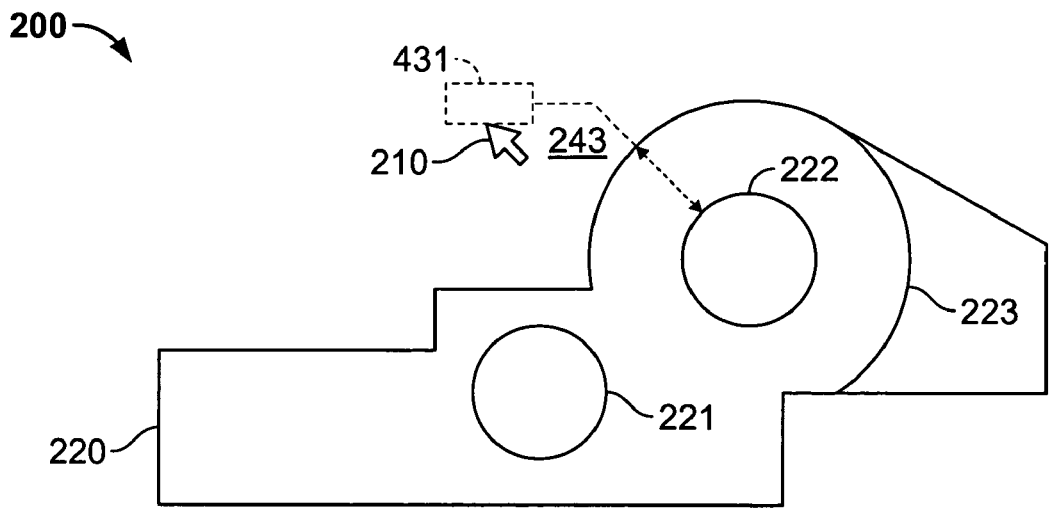

FIG. 4b illustrates displaying of a second stored temporary dimension type in response to a second pressing of the BACKSPACE key on the keyboard. As illustrated in FIG. 4b, the second stored temporary dimension type 431 is displayed in response to the second pressing of the BACKSPACE key on the keyboard. The second stored temporary dimension type 431 displayed may be the concentric temporary dimension type 233 (shown in FIGS. 2d and 3d). Similar to FIGS. 2d and 3d, the user second stored temporary dimension type 431 is displayed in the area 243 around the mechanical design 200 in response to the location of the cursor 210.

Figure 4C:
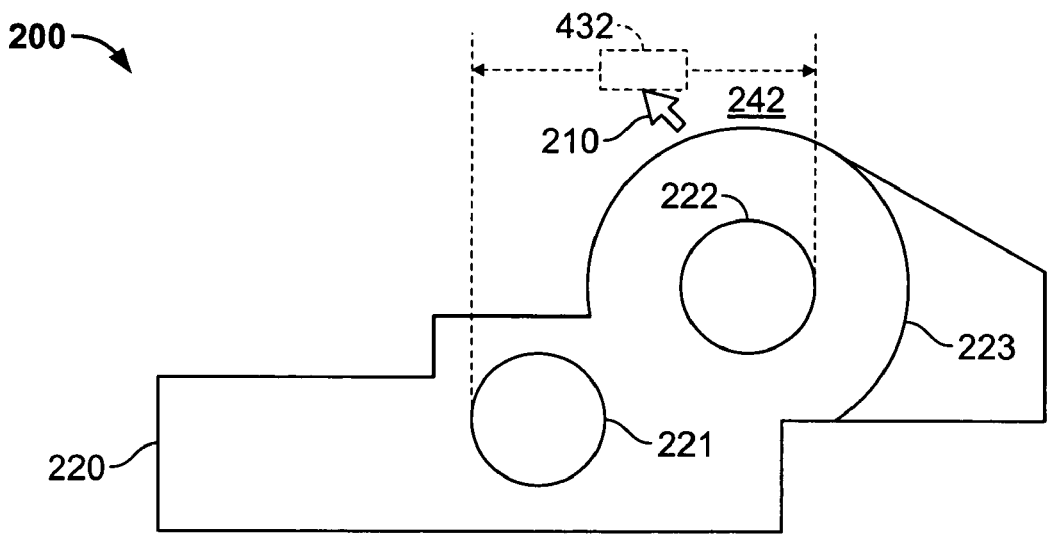

FIG. 4c illustrates displaying of a third stored temporary dimension type in response to a third pressing of the BACKSPACE key on the keyboard. As illustrated in FIG. 4c, the third stored temporary dimension type 432 is displayed in response to the third pressing of the BACKSPACE key on the keyboard. The third stored temporary dimension type 432 displayed may be the tangent to tangent temporary dimension type 232 (shown in FIGS. 2c and 3c). Similar to FIGS. 2c and 3c, the user third stored temporary dimension type 432 is displayed in the area 242 around the mechanical design 200 in response to the location of the cursor 210.

Figure 4D:
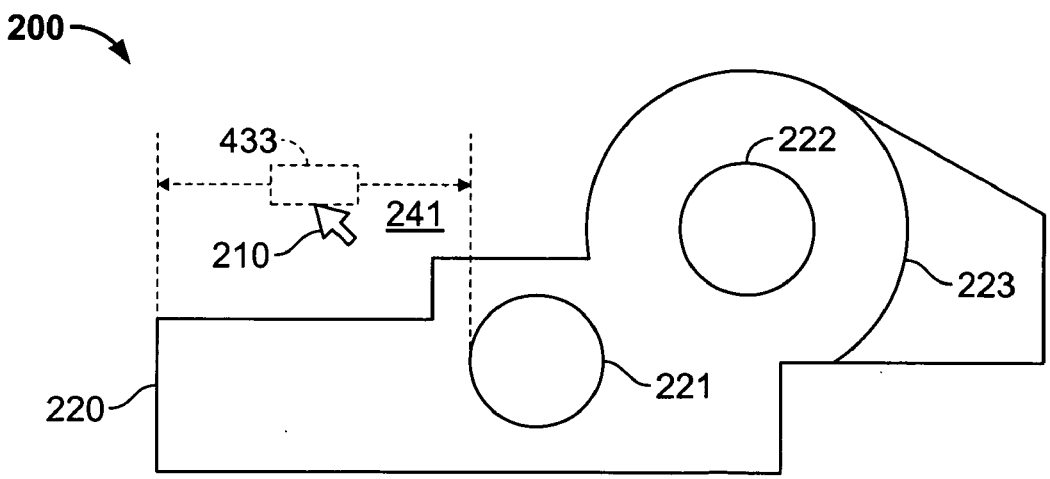

FIG. 4d illustrates displaying of a fourth stored temporary dimension type in response to a fourth pressing of the BACKSPACE key on the keyboard. As illustrated in FIG. 4d, the fourth stored temporary dimension type 433 is displayed in response to the fourth pressing of the BACKSPACE key on the keyboard. The fourth stored temporary dimension type 433 displayed may be the tangent temporary dimension type 231 (shown in FIGS. 2b and 3b). Similar to FIGS. 2b and 3b, the user fourth stored temporary dimension type 433 is displayed in the area 241 around the mechanical design 200 in response to the location of the cursor 210.

Figure 4E:
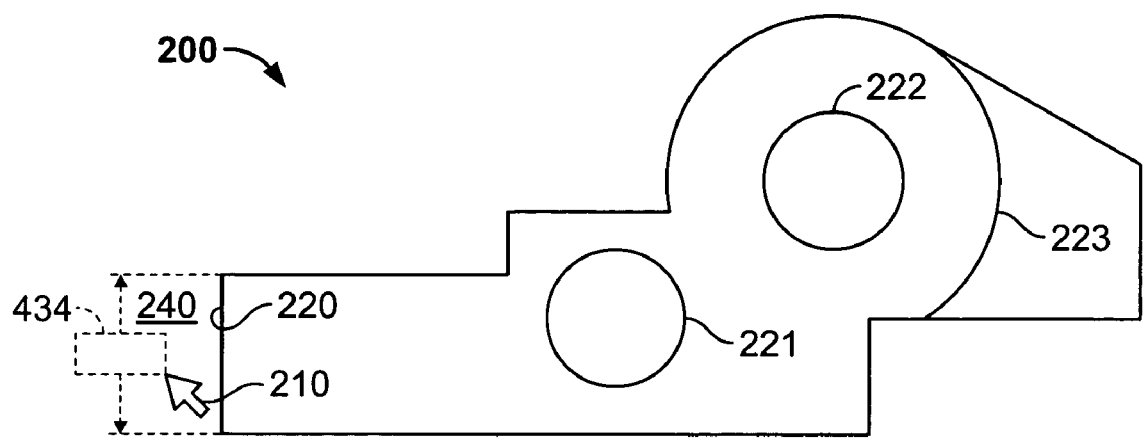

FIG. 4e illustrates displaying of a fifth stored temporary dimension type in response to a fifth pressing of the BACKSPACE key on the keyboard. As illustrated in FIG. 4e, the fifth stored temporary dimension type 434 is displayed in response to the fifth pressing of the BACKSPACE key on the keyboard. The fifth stored temporary dimension type 434 displayed may be the linear temporary dimension type 230 (shown in FIGS. 2a and 3a). Similar to FIGS. 2a and 3a, the user fifth stored temporary dimension type 434 is displayed in the area 240 around the mechanical design 200 in response to the location of the cursor 210.

Illustrated in FIGS. 4a–4e, the stored temporary dimension types are displayed in response to the pressing of the BACKSPACE key, however, it should be appreciated that the displaying of the stored temporary dimension types can be in response to any number of inputs know in the art including, but not limited to, a pressing of a SPACEBAR or any other manner known in the art. Additionally, FIGS. 4a–4e illustrate five stored temporary dimension types, however, it should be appreciated that a number of stored temporary dimension types is dependent upon a number of geometry pieces (n) selected by the user.

Furthermore, in FIGS. 4a–4e, as the stored temporary dimension types are displayed in response to the pressing of the BACKSPACE key on the keyboard, any one of the stored temporary dimension types can be selected as a permanent dimension type by a cursor click without displaying all of the stored temporary dimension types.

Figure 5:
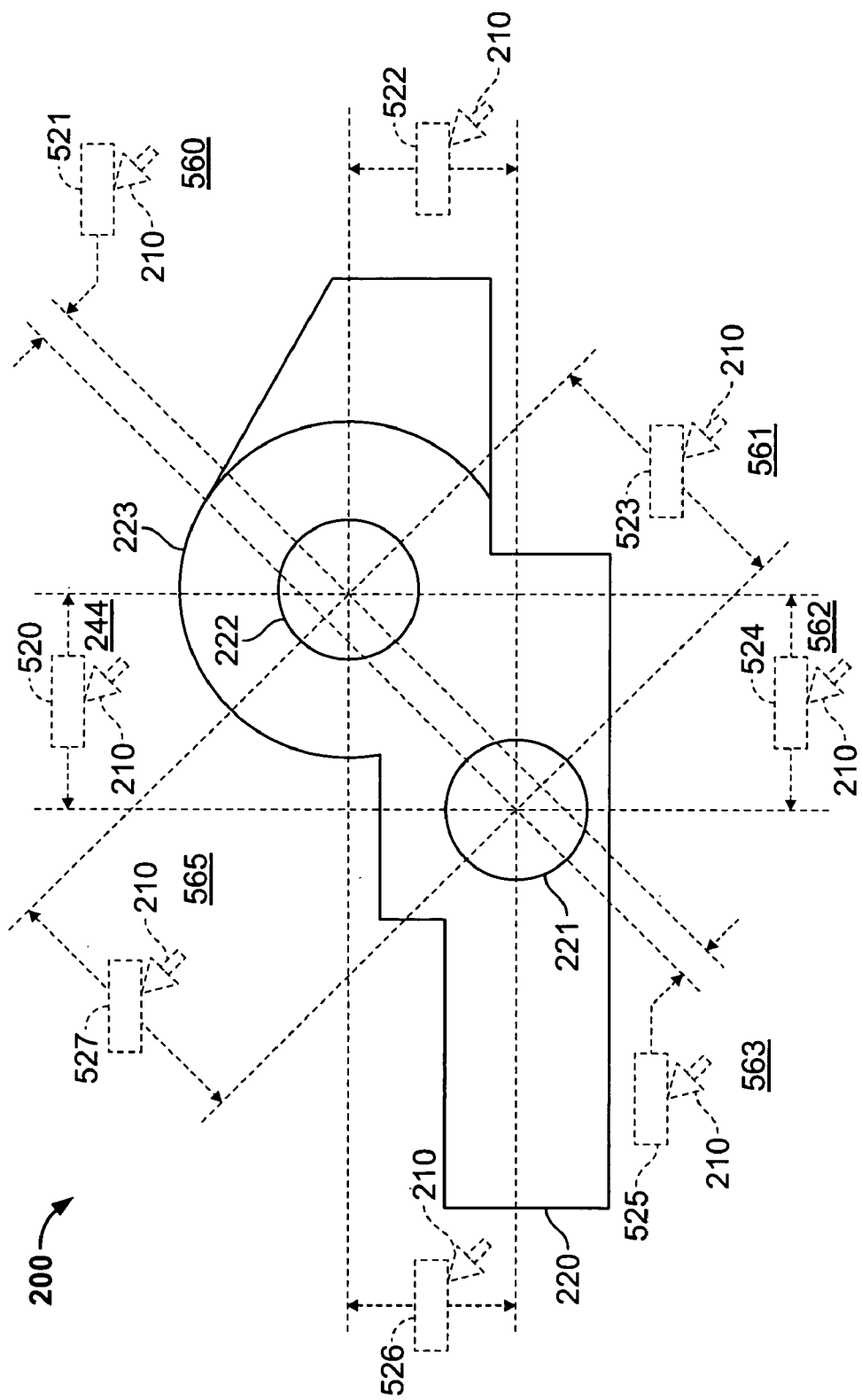
FIG. 5 illustrates displaying the selected one of the number of stored temporary dimension types as the permanent dimension type.

Once the permanent dimension type is selected for permanent display, the selected permanent dimension type can be further manipulated around the geometry piece by the cursor before final placement. FIG. 5 illustrates displaying the selected one of the number of stored temporary dimension types as the permanent dimension type. In the illustrated example of FIG. 5, the first stored temporary dimension type 430 (shown in FIG. 4a) is selected and displayed as the permanent dimension type 520. The permanent dimension type 520 displayed may be the linear temporary dimension type 234 (shown in FIGS. 2e and 3e). Similar to FIGS. 2e, 3e, and 4e, the permanent dimension type 520 is displayed in the area 240 around the mechanical design 200 in response to the location of the cursor 210. However, before, a permanent location of the permanent dimension type 520, the permanent dimension type 520 can be further manipulated depending upon the cursor 210 placement. As shown in FIG. 5, if cursor 210 is placed in locations 560–565, permanent dimension types 521–527 is displayed. Once the permanent location is selected, the permanent dimension type 520 changes to solid lines.

Figure 6:
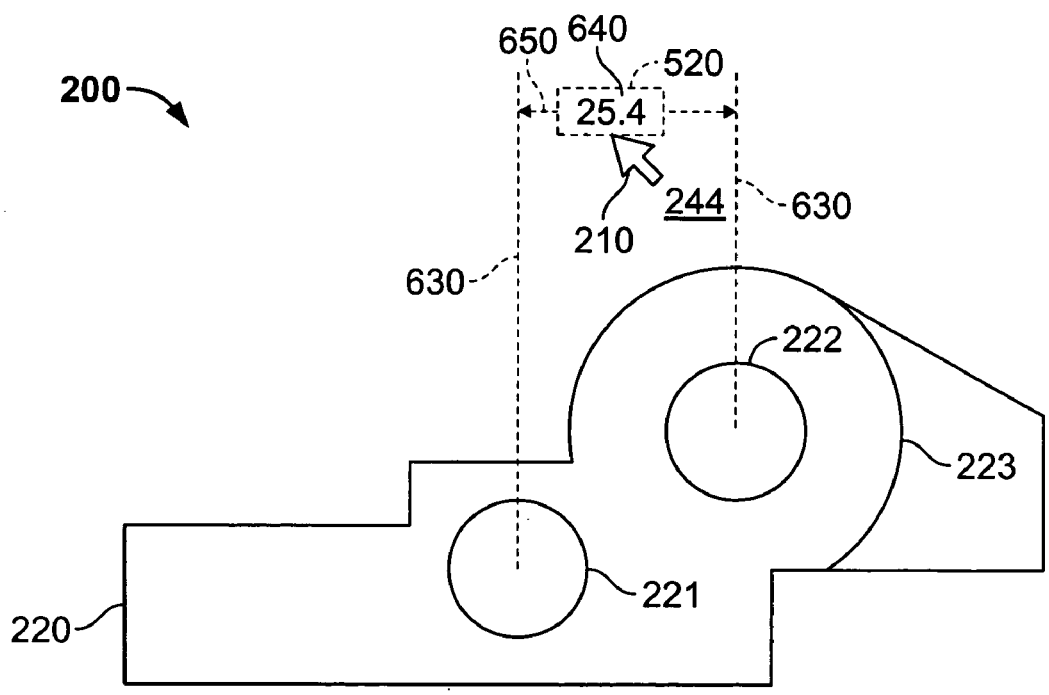
FIG. 6 illustrates displaying the permanent dimension type in response to the user selecting the permanent dimension type and placing the permanent dimension type in the permanent location around the geometry piece by a cursor click.

FIG. 6 illustrates displaying the permanent dimension type in response to the user selecting the permanent dimension type and placing the permanent dimension type in the permanent location around the geometry piece by a cursor click. Illustrated in FIG. 6, the permanent dimension type 520 is displayed in the area 244 in response to the user placing the cursor 210 and cursor clicking in location 244 around the geometry piece 200. The placement of the permanent dimension type 520 changes dimension entities 630 and 650 to solid lines and generates a dimension number 640 between the dimension entities 630. It should be appreciated that dimension entities may be of any type known in the art such as, but not limited to, leader lines. Additionally, the dimension number can be of any value denoting a dimension known in the art.

The displaying of several stored temporary dimension types (shown in FIGS. 4a–4e), displaying of the selected one of the number of stored temporary dimension types as the permanent dimension type (shown in FIG. 5), and displaying the permanent dimension type in response to the user selecting the permanent dimension type and placing the permanent dimension type in the permanent location around the geometry piece by a cursor click (shown in FIG. 6) may occur any time during the generating and the storing of the temporary dimension types (shown in FIGS. 2a–2e and 3a–3e).

Thus, it will be appreciated by those skilled in the art that a user can dimension geometry pieces, store temporary dimensions, retrieve the temporary dimension, select the desired dimension, further manipulate the desired dimension, and display the desired permanent dimension without requiring the user to recall the exact locations of geometry picks and recreate the desired dimensions. The present invention facilitates the user in scrolling through a number of stored dimensions and simply choose the desired dimension for display.

Figure 7A:
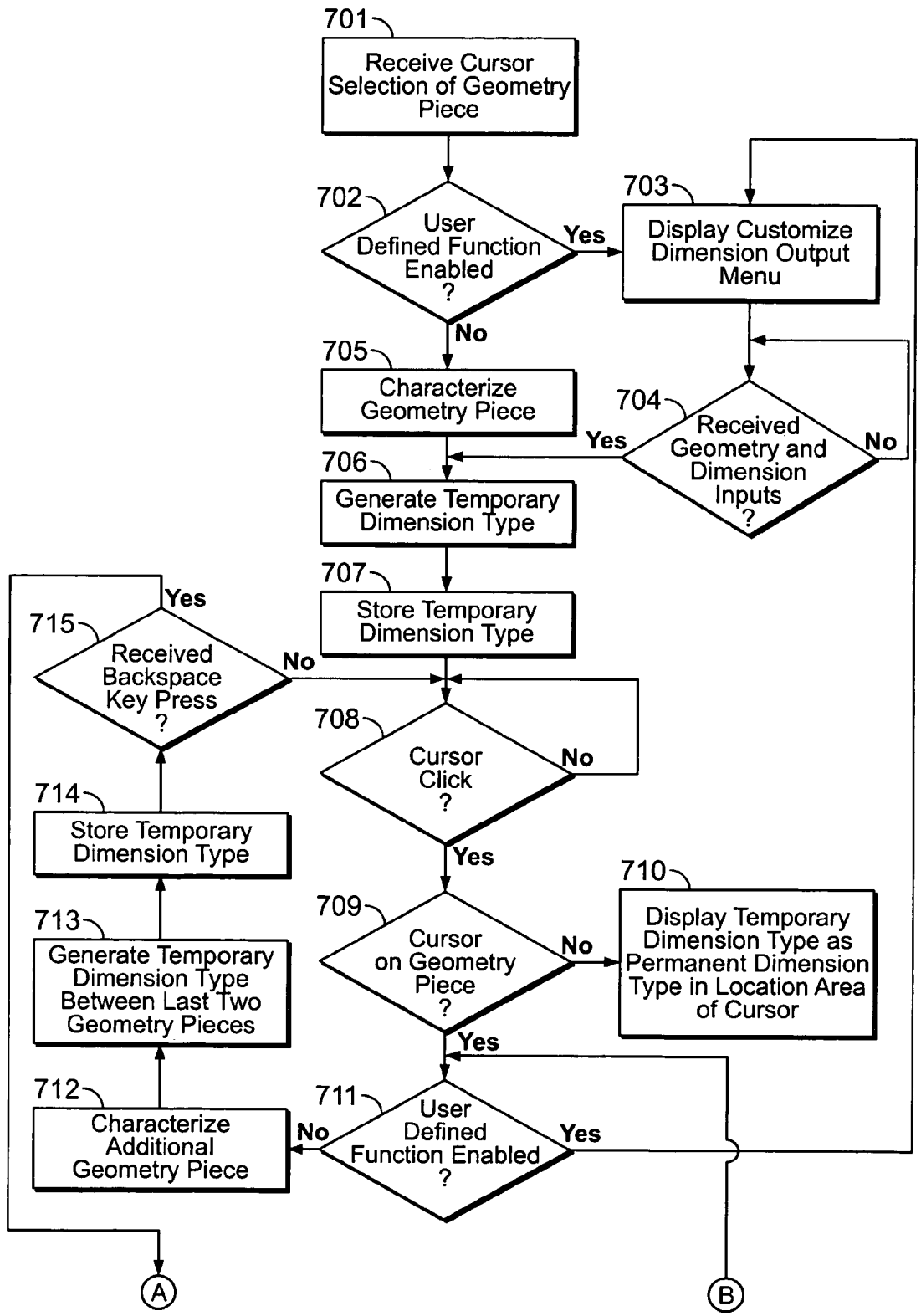
FIGS. 7a–7b illustrate the relevant operational flow of one embodiment of dimension manager 108 of FIG. 1.
Figure 7B:
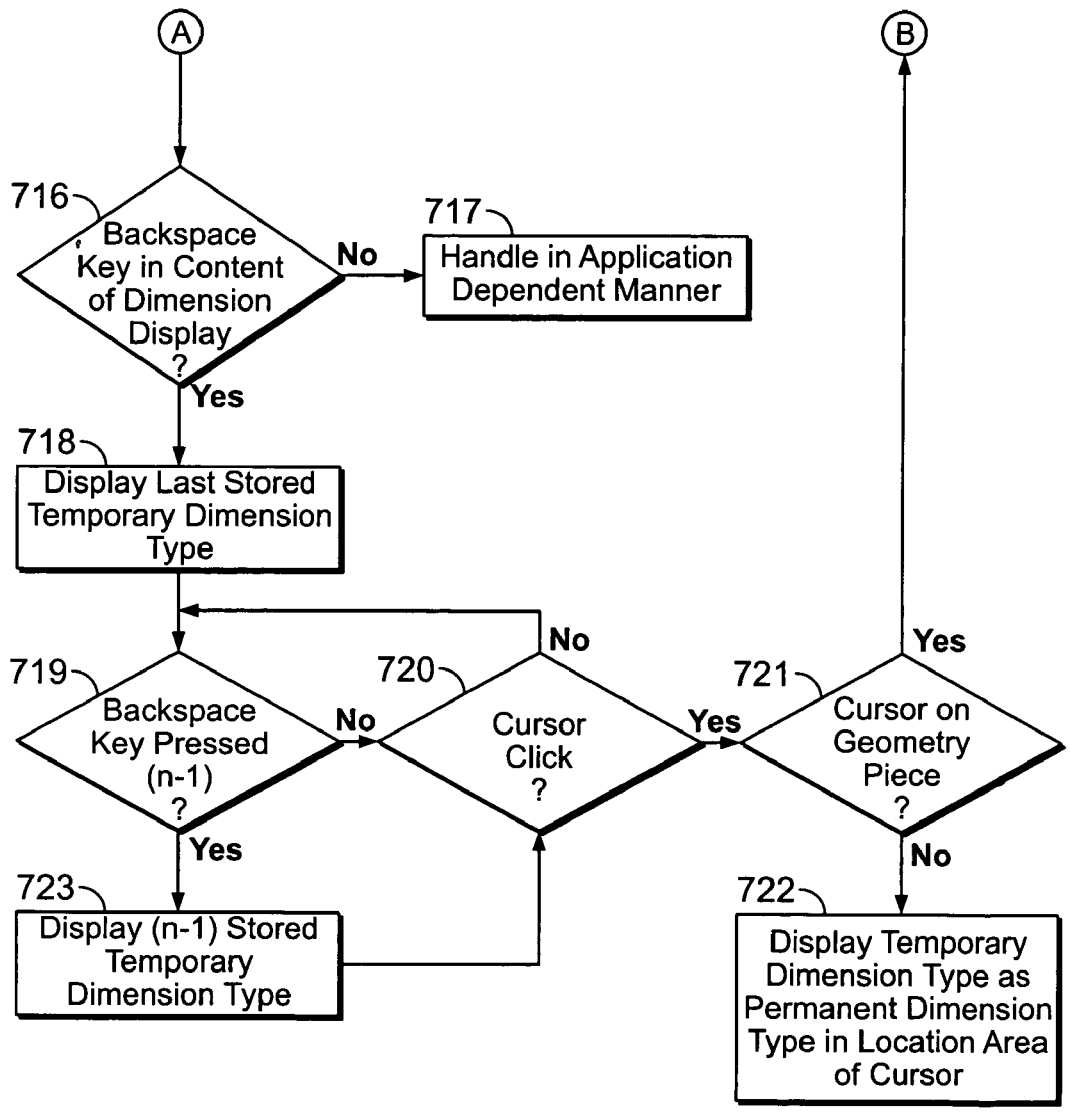

FIGS. 7a–7b illustrate the relevant operational flow of one embodiment of dimension manager 108 of FIG. 1. For the illustrated embodiment, dimension manager 108 is programmed in an event driven model, i.e., dimension manager 108 is designed to be executed in a system environment where various event notification services are available from the operating system. One example of such an operating system suitable for practicing the present invention is the Windows® operating systems, available from Microsoft Corporation of Redmond, Wash. In alternate embodiments, dimension manager 108 may be implemented in other programming approaches known in the art.

As shown in FIG. 7a, responsive to an event notification informing dimension manager 108 of the fact that the user has selected a geometry piece by placing a cursor on a geometry piece and clicking on the geometry piece 701. Once the geometry piece is selected, the dimension manager 108 determines if a user defined function is enabled 702. If the dimension manager 108 determines that the user defined function is enabled, the dimension manager causes other functional blocks of design engine 104 to display a customize dimension output menu 703. The customize dimension output menu is displayed until the geometry and dimension inputs are received 704. However, if the user defined function is not enabled, the dimension design manager 108 causes other functional blocks of design engine 104 to characterize the geometry piece 705, generate a temporary dimension type 706, and store the temporary dimension type in a design database 106.

The dimension manager 108 awaits a cursor click 708. Once the cursor click is received, the dimension manager 108 determines if the cursor click is on a geometry piece 709. If the dimension manager 108 determines that the cursor is not on a geometry piece, the dimension manager 108 causes other functional blocks of design engine 104 to display the stored temporary dimension type as a permanent dimension type in an area in response to a location of the cursor 710. If the dimension manager 108 determines that the cursor is on a geometry piece, the dimension manager 108 determines if a user defined function is enabled 711. If the dimension manager determines that the user defined function is enabled, the dimension manager 108 causes other functional blocks of design engine 104 to display the customize dimension output menu 703. However, if the dimension manager 108 determines that the user defined function is not enabled, the dimension manager 108 causes other functional blocks of design engine 104 to characterize another geometry piece 712, generate another temporary dimension type between the last two geometry pieces 713, and store the new temporary dimension type 714. Once the new temporary dimension type is stored, the dimension manager determines if a BACKSPACE key is pressed 715. If the BACKSPACE key is not pressed, the dimension manager 108 awaits a cursor click 708 and may generate and store additional temporary dimension types.

In FIG. 7b, if the BACKSPACE key is pressed, the dimension manager 108 determines if the BACKSPACE key is pressed in context of dimension display 716. If the dimension manager 108 determines that the BACKSPACE key is not pressed in context of dimension display, the BACKSPACE key is handled in an application dependent manner 717 which can include, but not limited to, a word processing application.

However, if the dimension manager 108 determines that the BACKSPACE key is pressed in context of dimension display, the dimension manager 108 causes other functional blocks of design engine 104 to display the last stored temporary dimension type 718.

The dimension manager 108 then determines if the BACKSPACE key is pressed additional times 719. If the BACKSPACE key is not pressed additional times, the dimension manager 108 awaits a cursor click 720. If the cursor click is detected, the dimension manager determines if the cursor is on a geometry piece 721. If the cursor is not on a geometry piece, the dimension manager 108 causes other functional blocks of design engine 104 to display the displayed stored temporary dimension type as a permanent dimension type in an area in response to a location of the cursor 722. However, if the cursor is on a geometry piece, the dimension engine 108 determines if the user defined function is enabled 711 (shown in FIG. 7a).

If the dimension manager 108 determines that the BACKSPACE key is pressed additional times, the dimension manager 108 causes other functional blocks of design engine 104 to display the stored temporary dimension type corresponding to the number of BACKSPACE key presses 723, and then, await a cursor click 720.

It should be appreciated by those skilled in the art that the manner in which other functional blocks effectuate the operational flow of one embodiment of the present invention, as shown in FIGS. 7a and 7b, may be implemented in any one of a number of manners known in the art. Additionally, the operational flow shown in FIGS. 7a and 7b should not be construed as to be distinct steps, but instead, the operational flow illustrates relationships between the different functional blocks of the present invention.

Figure 8:
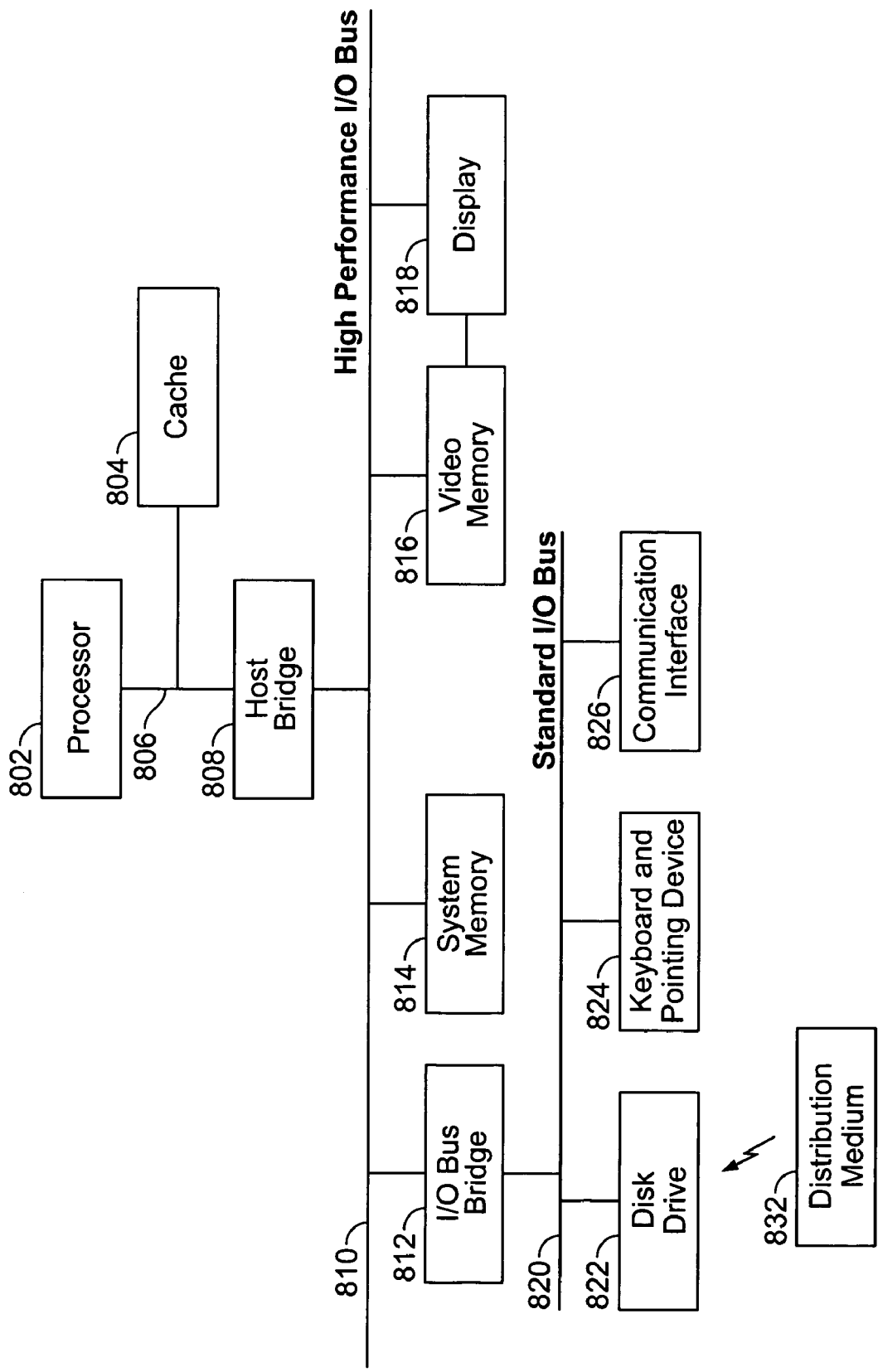
FIG. 8 illustrates one embodiment of a computer system suitable to be programmed with the mechanical design application of the present invention.

FIG. 8 illustrates one embodiment of a computer system suitable to be programmed with the mechanical design application of the present invention. As shown, for the illustrated embodiment, computer 800 includes processor 802, processor bus 806, high performance I/O bus 810 and standard I/O bus 820. Processor bus 806 and high performance I/O bus 810 are bridged by host bridge 808, whereas I/O buses 810 and 812 are bridged by I/O bus bridge 812. Coupled to processor bus 806 is cache 804. Coupled to high performance I/O bus 810 are system memory 814 and video memory 816, against which video display 818 is coupled. Coupled to standard I/O bus 820 are disk drive 822, keyboard and pointing device 824, and communication interface 826.

These elements perform their conventional functions known in the art. In particular, disk drive 822 and system memory 814 are used to store permanent and working copies of the mechanical design system. The permanent copies may be pre-loaded into disk drive 822 in factory, loaded from distribution medium 832, or down loaded from a remote distribution source (not shown). Distribution medium 832 may be a tape, a CD, a DVD or other storage medium of the like. The constitutions of these elements are known. Any one of a number of implementations of these elements known in the art may be used to form computer system 800.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a mechanical design application with improved facility for dimension generation displaying has been described.

What is claimed is:

1. A method comprising:
    receiving a user input selecting a geometry piece of a computer-aided design model;
    determining a geometry type that characterizes the selected geometry piece;
    receiving a second user input selecting a second geometry piece of the computer-aided design model;
    determining a second geometry type that characterizes the second geometry piece;
    generating a temporary dimension type based at least in part upon the geometry type of the geometry piece, where a temporary dimension type specifies a type of a dimension related to the geometry piece and wherein the temporary dimension type specifies a dimension of the geometry piece relative to the second geometry piece;
    storing said temporary dimension type; and
    displaying a representation of said temporary dimension type.

2. The method of claim 1, wherein the geometry type and the second geometry type are both arcs, the method further comprising:
    determining if said arcs are co-located; and
    generating a concentric temporary dimension type between said arcs if said arcs are determined to be co-located.

3. The method of claim 1, wherein the geometry type and the second geometry type are both arcs, the method further comprising:
    determining if said arcs are apart; and
    generating a tangent-to-tangent temporary dimension type between said arcs if said arcs are determined to be apart.

4. The method of claim 1, wherein a geometry type of one of said geometry pieces is determined to be an arc and a geometry type of said other geometry piece is determined to be a line, the method further comprising:
    generating a tangent temporary dimension type between said arc and said line.

5. The method of claim 1, further comprising:
    receiving a user input selecting the temporary dimension type as a permanent dimension type; and
    displaying a representation of the permanent dimension type at a location on the computer-aided design model based on a user input.

6. The method of claim 1, further comprising:
    determining a measurement of the temporary dimension type with respect to the first and second geometry pieces; and
    displaying the measurement.

7. The method of claim 1, further comprising:
    selectively, in response to a user input, displaying or hiding the representation of the temporary dimension type.

8. A method comprising:
    receiving a user input selecting a geometry piece of a computer-aided design model;
    determining a geometry type that characterizes the selected geometry piece;
    generating a temporary dimension type based at least in part upon the geometry type of the geometry piece, where a temporary dimension type specifies a type of a dimension related to the geometry piece;
    storing said temporary dimension type;
    displaying a representation of a first temporary dimension type of a plurality of stored temporary dimension types;
    receiving a user input to display a representation of a second temporary dimension type of the plurality of stored temporary dimension types;
    hiding the representation of the first temporary dimension type; and
    displaying the second temporary dimension type.

9. A storage medium having stored therein a plurality of instructions that are machine executable, wherein when executed, said executing instructions operate to:
    receive a user input selecting a geometry piece of a computer aided design model;
    determine a geometry type that characterizes the selected geometry piece;
    receive a second user input selecting a second geometry piece of the computer-aided design model;
    determine a second geometry type that characterizes the second geometry piece;
    generate a temporary dimension type based at least in part upon the geometry type of the geometry piece, where a temporary dimension type specifies a type of a dimension related to the geometry piece and wherein the temporary dimension type specifies a dimension of the geometry piece relative to the second geometry piece;
    store said temporary dimension type; and
    display said temporary dimension type.

10. The storage medium of claim 9, wherein the geometry type and the second geometry type are both arcs, and said executing instructions further operate to:
    determine if said arcs are co-located; and
    generate a concentric temporary dimension type between said arcs in response to determining said arcs being co-located.

11. The storage medium of claim 9, wherein the geometry type and the second geometry type are both arcs, and said executing instructions further operate to:
    determine if said arcs are apart; and
    generate a tangent-to-tangent temporary dimension type between said arcs in response to determining said arcs being apart.

12. The storage medium of claim 9, wherein a geometry type of one of said geometry pieces is determined to be an arc and a geometry piece of said other geometry piece is determined to be a line, and said executing instructions further operate to:
    generate a tangent temporary dimension type between said arc and a line.

13. The storage medium of claim 9, further comprising executing instructions operable to:
    receive a user input selecting the temporary dimension type as a permanent dimension type; and
    display a representation of the permanent dimension type at a location on the computer-aided design model according to a user input.

14. The storage medium of claim 9, wherein said executing instructions further operate to:
    determine a measurement of the temporary dimension type with respect to the first and second geometry pieces; and
    display the measurement.

15. A storage medium having stored therein a plurality of instructions that are machine executable, wherein when executed, said executing instructions operate to:

receive a user input selecting a geometry piece of a computer aided design model;

determine a geometry type that characterizes the selected geometry piece;

generate a temporary dimension type based at least in part upon the geometry type of the geometry piece, where a temporary dimension type specifies a type of a dimension related to the geometry piece;

store said temporary dimension type;

display a representation of a first temporary dimension type of a plurality of stored temporary dimension types;

receive a user input to display a representation of a second temporary dimension type of the plurality of stored temporary dimension types;

hide the representation of the first temporary dimension type; and display the second temporary dimension type.

16. An apparatus comprising:

a storage medium having stored therein a plurality of instructions that are machine executable, wherein when executed, said executing instructions operate to:

receive a user input selecting a geometry piece of a computer aided design model;

determine a geometry type that characterizes the selected geometry piece;

receive a second user input selecting a second geometry piece of the computer-aided design model;

determine a second geometry type that characterizes the second;

generate a temporary dimension type based at least in part upon the geometry type of the geometry piece, where a temporary dimension type specifies a type of a dimension related to the geometry piece and wherein the temporary dimension type specifies a dimension of the geometry piece relative to the second geometry piece;

store said temporary dimension type; and display said temporary dimension type; and a processor coupled to said storage medium to execute said instructions.

17. The apparatus of claim 16, wherein the geometry type and the second geometry type are both arcs, and said executing instructions further operate to:

determine if said arcs are co-located; and generate a concentric temporary dimension type between said arcs in response to determining said arcs being co-located.

18. The apparatus of claim 17, wherein the geometry type and the second geometry type are both arcs, and said executing instructions further operate to:

determine if said arcs are apart; and generate a tangent-to-tangent temporary dimension type between said arcs in response to determining said arcs being apart.

19. The apparatus of claim 17, wherein a geometry type of one of said geometry pieces is determined to be an arc and a geometry piece of said other geometry piece is determined to be a line, and said executing instructions further operate to:

generate a tangent temporary dimension type between said arc and a line.

20. The apparatus of claim 16, wherein said executing instructions operate to:

receive a user input selecting the temporary dimension type as a permanent dimension type; and display a representation of the permanent dimension type at a location on the computer-aided design model according to a user input.

21. The apparatus of claim 16, wherein said executing instructions further operate to:

determine a measurement of the temporary dimension type with respect to the first and second geometry pieces; and display the measurement.

22. An apparatus comprising:

a storage medium having stored therein a plurality of instructions that are machine executable, wherein when executed, said executing instructions operate to:

receive a user input selecting a geometry piece of a computer aided design model;

determine a geometry type that characterizes the selected geometry piece;

generate a temporary dimension type based at least in part upon the geometry type of the geometry piece, where a temporary dimension type specifies a type of a dimension related to the geometry piece;

store said temporary dimension type;

display a representation of a first temporary dimension type of a plurality of stored temporary dimension types;

receive a user input to display a representation of a second temporary dimension type of the plurality of stored temporary dimension types; and hide the representation of the first temporary dimension type; and a processor coupled to said storage medium to execute said instructions.

23. A method, comprising:

receiving a first user input selecting a first geometry piece of a computer-aided design model;

receiving a second user input selecting a second geometry piece of the computer-aided design model;

displaying a customize dimension output menu, the customize dimension output menu being operable to receive a user input selecting a first input geometry type of the first geometry piece, a second input geometry type of the second geometry piece, and a dimension output type;

receiving a user input selecting the first and second input geometry type and the dimension output type;

generating a temporary dimension type using the selected first and second input geometry type and the dimension output type; and displaying a representation of the temporary dimension type, the temporary dimension type specifying a dimension of the first geometry piece relative to the second geometry piece.

24. A computer program product, tangibly stored on a computer-readable medium, comprising instructions operable to cause a programmable processor to:

receive a first user input selecting a first geometry piece of a computer-aided design model;

receive a second user input selecting a second geometry piece of the computer-aided design model;

display a customize dimension output menu, the customize dimension output menu being operable to receive a user input selecting a first input geometry type of the first geometry piece, a second input geometry type of the second geometry piece, and a dimension output type;

receive a user input selecting the first and second input geometry type and the dimension output type;

generate a temporary dimension type using the selected first and second input geometry type and the dimension output type; and display a representation of the temporary dimension type, the temporary dimension type a dimension of the first geometry piece relative to the second geometry piece.

* * * * *

UNITED STATES PATENT AND TRADEMARK OFFICE
CERTIFICATE OF CORRECTION

PATENT NO.         : 7,076,412 B1                                              Page 1 of 1
APPLICATION NO.    : 09/569542
DATED              : July 11, 2006
INVENTOR(S)        : Kenneth L. Davis It is certified that error appears in the above-identified patent and that said Letters Patent is hereby corrected as shown below:

On the cover page, Item [56] References Cited; Add:
    6,295,069 09-2001 Shirur    345/420
    5,615,321 03-1997 Corn     345/643
    5,467,293 11-1995 Summer et. al.   703/2

In Column 13, Claim 18, Line 48; Replace:
    "claim 17"
    -- claim 16 --

In Column 13, Claim 19, Line 55; Replace:
    "claim 17"
    -- claim 16 --

In Column 14, Claim 22, Line 25; Replace:
    "type; and a processor" with
    -- type; and
  a processor... --

In Column 14, Claim 24, Line 66; Replace:
    "dimension type a dimension" with
    -- dimension type specifying a dimension --

Signed and Sealed this

Eleventh Day of September, 2007

JON W. DUDAS
*Director of the United States Patent and Trademark Office*